United States Patent
Oroskar et al.

(10) Patent No.: US 10,779,198 B1
(45) Date of Patent: Sep. 15, 2020

(54) ADJUSTING HANDOVER THRESHOLDS FOR HIGH POWER CLASS WIRELESS DEVICES

(71) Applicant: Sprint Spectrum LP, Overland Park, KS (US)

(72) Inventors: Siddharth Oroskar, Overland Park, KS (US); Jasinder Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 289 days.

(21) Appl. No.: 15/678,587

(22) Filed: Aug. 16, 2017

(51) Int. Cl.
    *H04W 36/00*      (2009.01)
    *H04W 36/30*      (2009.01)
    *H04W 36/36*      (2009.01)
    *H04W 88/02*      (2009.01)

(52) U.S. Cl.
CPC ....... *H04W 36/0027* (2013.01); *H04W 36/30* (2013.01); *H04W 36/36* (2013.01); *H04W 88/02* (2013.01)

(58) Field of Classification Search
None
See application file for complete search history.

(56) References Cited

U.S. PATENT DOCUMENTS

| | | | | |
|---|---|---|---|---|
| 9,084,119 B2 * | 7/2015 | Damnjanovic | ....... | H04L 5/0007 |
| 9,386,497 B1 * | 7/2016 | Sitaram | ........... | H04W 36/00837 |
| 9,585,072 B1 * | 2/2017 | Liu | ........... | H04L 5/14 |
| 2007/0191013 A1 * | 8/2007 | Gunnarsson | .......... | H04W 36/04 |
| | | | | 455/438 |
| 2008/0003978 A1 * | 1/2008 | Sengupta | .............. | H04W 8/005 |
| | | | | 455/410 |
| 2009/0325626 A1 * | 12/2009 | Palanki | ................. | H04L 5/0007 |
| | | | | 455/522 |
| 2010/0173637 A1 * | 7/2010 | Damnjanovic | ....... | H04L 5/0007 |
| | | | | 455/447 |
| 2011/0319112 A1 * | 12/2011 | Jeong | .................. | H04W 36/00 |
| | | | | 455/509 |
| 2012/0069756 A1 * | 3/2012 | Ji | ...................... | H04W 36/0016 |
| | | | | 370/252 |
| 2012/0106477 A1 * | 5/2012 | Kwon | ................. | H04W 52/365 |
| | | | | 370/329 |
| 2012/0207133 A1 * | 8/2012 | Wong | .................... | H04L 5/0058 |
| | | | | 370/331 |
| 2014/0010086 A1 * | 1/2014 | Etemad | ................... | H04W 4/70 |
| | | | | 370/235 |
| 2014/0064253 A1 * | 3/2014 | Deivasigamani | ..... | H04W 36/30 |
| | | | | 370/332 |
| 2014/0092785 A1 * | 4/2014 | Song | ................. | H04W 28/0278 |
| | | | | 370/280 |
| 2014/0100003 A1 * | 4/2014 | Hsieh | ................ | H04W 52/0241 |
| | | | | 455/574 |

(Continued)

*Primary Examiner* — Edan Orgad
*Assistant Examiner* — Emmanuel K Maglo

(57) ABSTRACT

Adjusting handover thresholds includes identifying a channel bandwidth of a first carrier deployed by an access node, wherein the first carrier is one of at least two carriers deployed by the access node and, for a wireless device attached to a second carrier deployed by the access node, adjusting a handover threshold based on the channel bandwidth of the first carrier, and/or the frame configuration deployed by the second carrier. The wireless device is assigned to a high power class and capable of operating in a carrier aggregation mode utilizing the first and second carriers.

20 Claims, 9 Drawing Sheets

(56) References Cited

U.S. PATENT DOCUMENTS

| | | | |
|---|---|---|---|
| 2014/0105040 A1* | 4/2014 | Baker | H04W 52/367 370/252 |
| 2014/0148212 A1* | 5/2014 | Gusavac | H04W 52/143 455/522 |
| 2014/0200003 A1* | 7/2014 | Kodali | H04W 36/30 455/436 |
| 2014/0233457 A1* | 8/2014 | Koutsimanis | H04J 11/005 370/328 |
| 2015/0045028 A1* | 2/2015 | Singh | H04W 36/0094 455/436 |
| 2015/0087296 A1* | 3/2015 | Kim | H04W 52/365 455/422.1 |
| 2015/0117247 A1* | 4/2015 | Wang | H04W 24/08 370/252 |
| 2015/0131544 A1* | 5/2015 | Behravan | H04L 5/0035 370/329 |
| 2015/0141014 A1 | 5/2015 | Huang et al. | |
| 2015/0173009 A1 | 6/2015 | Vallath et al. | |
| 2016/0029248 A1* | 1/2016 | Syed | H04W 28/08 370/235 |
| 2016/0044606 A1* | 2/2016 | Yin | H04W 52/367 455/450 |
| 2016/0094968 A1* | 3/2016 | Papa | H04W 52/143 455/404.1 |
| 2016/0353342 A1* | 12/2016 | Futaki | H04W 36/04 |
| 2016/0373064 A1* | 12/2016 | Lin | H04B 1/0458 |
| 2017/0302419 A1* | 10/2017 | Liu | H04W 48/12 |
| 2018/0049207 A1* | 2/2018 | Lim | H04B 17/102 |
| 2018/0062796 A1* | 3/2018 | Feng | H04L 1/1812 |
| 2018/0098291 A1* | 4/2018 | Fodor | H04W 52/14 |

\* cited by examiner

ADJUSTING HANDOVER THRESHOLDS FOR HIGH POWER CLASS WIRELESS DEVICES

TECHNICAL BACKGROUND

As wireless networks evolve and grow in complexity, there are ongoing challenges associated with reaching targeted coverage levels. Recently, in an effort to boost coverage and enhance throughput in wireless networks, network operators have proposed deployment of wireless devices capable of transmitting at a maximum allowable transmit power that is higher than a current maximum allowable transmit power of off-the-shelf wireless devices and/or other currently deployed low power wireless devices. As shown in Table 1 below, the maximum allowable transmit power for wireless devices can be defined by the power class of the wireless device.

TABLE 1

| Operating Band | Power Class 1 Wireless Device | | Power Class 2 Wireless Device | | Power Class 3 Wireless Device | | Power Class 4 Wireless Device | |
|---|---|---|---|---|---|---|---|---|
| | Power (dBm) | Tol. (dB) | Power (dBm) | Tol. (dB) | Power (dBm) | Tol. (dB) | Power (dBm) | Tol. (dB) |
| Band I | 31 | ±2 | 26 | ±2 | 23 | ±2 | 21 | ±2 |
| Band II | — | — | 26 | ±2 | 23 | ±2 | 21 | ±2 |
| Band III | — | — | — | — | 23 | ±2 | 21 | ±2 |

For example, the maximum allowable transmit power level and tolerance (i.e., power error limits) with which wireless devices can transmit data on a given frequency band or sub-band (e.g., bands I-III) can be specified based on a pre-defined power class (e.g., power classes 1-4 illustrated in Table 1) of the wireless device rather than a physical maximum transmit capability of the wireless device. Off-the-shelf and/or other low-power wireless devices are currently defined in LTE as power class 3 and/or power class 4 wireless devices. Power class 3 and/or power class 4 low-power wireless devices (hereinafter referred to as standard or low-powered wireless devices, with the terms "standard" and "low" being equivalent and defined as any power level that is not "high") can be configured with a maximum allowable transmit power level of +23 dBm for frequency bands I-III with a nominal power tolerance of ±2 dB (e.g., for E-UTRA bands). High-power class wireless devices (hereinafter referred to as high-powered wireless device) are currently defined as power class 1 or power class 2 wireless devices. Power class 1 and/or power class 2 high-power class wireless devices can be configured with a maximum allowable transmit power level of +26 dBm for frequency bands I-II with a nominal power tolerance±2 dB (e.g., for E-UTRA bands), as illustrated in Table 1.

Further, in wireless networks that deploy multiple frequency bands within a single geographic area, such as co-located cells or access nodes, inter-frequency handovers are used to offload end-user wireless devices from a congested frequency band to a non-congested frequency band. Typically, inter-frequency handovers are triggered based on radiofrequency (RF) strength of signals transmitted from one or more access nodes. For example, in a long-term evolution (LTE) system, signal level parameters including thresholds are transmitted to end-user wireless devices in system information block (SIB) messages, and measurement events such as A2, A3 and A5 events can trigger a handover request from an end-user wireless devices based on whether or not a signal level of an access node exceeds or falls below a threshold. Some handovers may be forced in order to perform load balancing operations.

Overview

Exemplary embodiments described herein include systems, methods, and processing nodes for adjusting handover thresholds for high-powered wireless devices in a wireless network based on a bandwidth of carriers deployed by the wireless network. An exemplary method described herein for adjusting handover thresholds includes identifying a channel bandwidth of a first carrier deployed by an access node, wherein the first carrier is one of at least two carriers deployed by the access node and, for a wireless device attached to a second carrier deployed by the access node, adjusting a handover threshold based on the channel bandwidth of the first carrier. The wireless device is assigned to a high power class and capable of operating in a carrier aggregation mode utilizing the first and second carriers.

Exemplary systems described herein for adjusting handover thresholds in a wireless network include a processing node and a processor coupled to the processing node, the processor for configuring the processing node to perform operations including identifying a wireless device assigned to a high power class and capable of operating in a carrier aggregation mode, and raising a first handover threshold of a first carrier having a low bandwidth, such that a handover of the wireless device to the first carrier is prevented. The high power class enables the wireless device to utilize a transmission power level that is higher than a standard transmission power level utilized by other wireless devices assigned to a standard power class. The operations further comprise lowering a second handover threshold of a second carrier having a high bandwidth, such that a handover of the wireless device to the second carrier is performed.

An exemplary processing node described herein for adjusting handover thresholds is configured to perform operations including determining a resource requirement of a high-powered wireless device attached to a first carrier. The high-powered wireless device is configured to utilize a transmission power level that is higher than a standard transmission power level utilized by standard-powered wireless devices. The resource requirement comprises one of an increased uplink resource requirement or an increased downlink resource requirement. The operations further include adjusting one or more handover thresholds for a handover of the high-powered wireless device to a second carrier based, in part, on a frame configuration of the first carrier. The frame configuration comprises one of an uplink-biased frame configuration and a downlink-biased frame configuration. Upon being handed over to the second carrier, the wireless device is configured to utilize carrier aggregation with the second carrier as a primary carrier and the first carrier as a secondary carrier.

DETAILED DESCRIPTION

Figure 1:
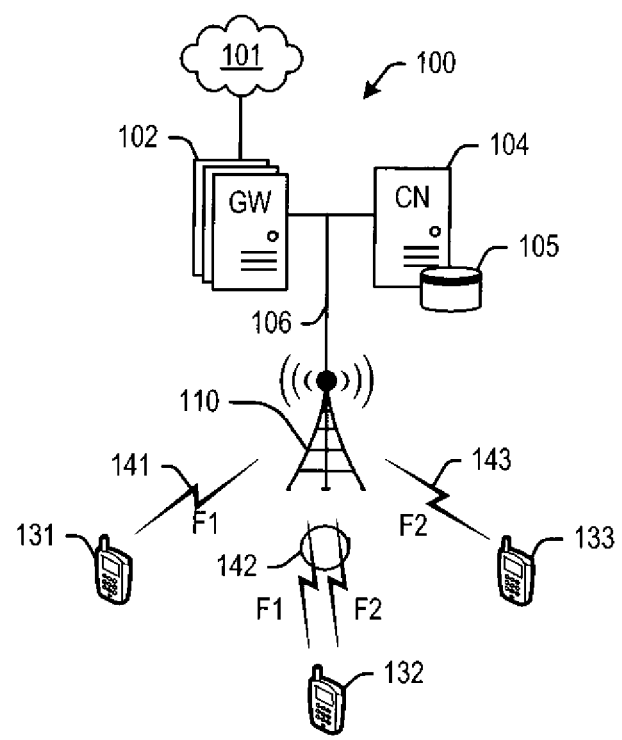
FIG. 1 depicts an exemplary system for adjusting handover thresholds for high-powered wireless devices in a wireless network.

Exemplary embodiments described herein include systems, methods, and processing nodes for adjusting handover thresholds for high-powered wireless devices in a wireless network based on a bandwidth of carriers deployed by the wireless network. The high-powered wireless devices may be any wireless devices that are assigned to a high power class. For example, the high power class enables the wireless device to utilize a transmission power level that is higher than a standard transmission power level utilized by other wireless devices assigned to a standard power class. Further, the wireless devices may be capable of operating in a carrier aggregation mode. Operations described herein include determining that the wireless device is assigned to the high power class based on an attach request received by the wireless network, or a maximum transmit power level requested from the wireless device. Similarly, determining a carrier-aggregation capability of the wireless device may be based on a capability report in the attach request, or any other source of information related to attributes of the high-powered wireless devices.

Once a high-powered wireless device capable of carrier aggregation is identified, handover thresholds for such devices are adjusted based on a channel bandwidth of one or more carriers deployed within the wireless network. In an exemplary embodiment, the high-powered wireless device is attached to a first carrier, and a bandwidth is identified for the first carrier and a second carrier deployed by the wireless network. If the second carrier has a low bandwidth, then a handover threshold of the second carrier is raised, such that a handover of the high-powered wireless device to the second carrier is prevented or discouraged. For example, a channel bandwidth of the second carrier may be below a bandwidth threshold. This triggers an adjustment to the handover threshold associated with the second carrier, such that the high-powered wireless device is discouraged from initiating a handover to the second carrier. Adjusting the handover threshold may include increasing or raising a threshold signal level associated with the second carrier. The adjustment may further comprise decreasing or lowering a threshold signal level of the first carrier, such that the high-powered wireless device remains attached to the first carrier for a longer time.

In another exemplary embodiment, if the second carrier has a high bandwidth, then a handover threshold of the second carrier is lowered, such that a handover of the high-powered wireless device to the second carrier is performed or encouraged. For example, a channel bandwidth of the second carrier may be above a bandwidth threshold. This triggers an adjustment to the handover threshold associated with the second carrier, such that the high-powered wireless device is encouraged to initiate a handover to the second carrier. Adjusting the handover threshold may include decreasing or lowering a threshold signal level associated with the second carrier. The adjustment may further comprise increasing or raising a threshold signal level of the first carrier, such that the high-powered wireless device is triggered to detach from the first carrier sooner.

In another exemplary embodiment, handover thresholds for high-powered wireless devices are adjusted based on matching a resource requirement of a high-powered wireless device with a frame configuration of a carrier to which the high-powered wireless device is attached. For example, a first type of carrier and a second type of carrier may be deployed within a wireless network. The first and second type may include different types of duplexing modes. For example, carriers of the first type may be deployed by the first access node using a frequency division duplexing (FDD) mode, and carriers of the second type may be deployed by the second access node using a time division duplexing (TDD) mode. Within an exemplary long-term evolution (LTE) system, the first type of carrier may include a FDD-LTE carrier, and the second type of carrier may include a TDD-LTE carrier. In these embodiments, operations performed include determining a resource requirement of a high-powered wireless device attached to the TDD carrier. The resource requirement may include either an increased uplink resource requirement, or an increased downlink resource requirement. The determination of increased uplink versus downlink requirements may be based on thresholds defined by a network operator. The resource requirement is compared with a frame configuration of radio frames deployed within the TDD carrier. For example, the frame configuration for each frame comprises a sequence of subframes that may be either uplink-biased or downlink-biased. Similar to the resource requirement, the 'bias' of each frame configuration may be based on thresholds defined by a network operator. In some embodiments, an association is formed between different resource requirements and different frame configurations.

Subsequently, when a match is determined between the resource requirement and a frame configuration, (i.e. a wireless device requiring more uplink resources is attached to an uplink-biased carrier), the one or more thresholds are adjusted to prevented or discourage a handover to an FDD carrier, as described herein. Alternatively, upon determining that the resource requirement and frame configuration do not match (i.e. a wireless device with an increased downlink resource requirement attached to a TDD carrier with an uplink-biased frame configuration, or a wireless device with an increased uplink resource requirement attached to a TDD carrier with a downlink-biased frame configuration) the one or more handover thresholds are adjusted such that a handover to of the high-powered wireless device to the FDD carrier is performed or encouraged, as described herein.

The adjusted handover thresholds may be transmitted to the high-powered wireless device via a control message by one or more access nodes deploying the first and second carriers. In some embodiments, bandwidths of a plurality of carriers are identified, and handover thresholds for each carrier are adjusted accordingly, and transmitted to each high-powered wireless device. The high-powered wireless device may report signal level measurements of different carriers, and handovers performed or prevented based on the updated thresholds. In an exemplary embodiment, upon being handed over to a second carrier, the high-powered wireless device is configured to utilize carrier aggregation with the second carrier as a primary carrier and the first carrier as a secondary carrier, thereby making use of available bandwidth of both carriers. Further, in addition to the systems described herein, these operations may be implemented as computer-readable instructions or methods, and processing nodes on the network for executing the instructions or methods. These and other embodiments are further described herein and with reference to FIGS. 1-9.

FIG. 1 depicts an exemplary system for adjusting handover thresholds. System 100 comprises a communication network 101, gateway 102, controller node 104, access node 110, and wireless devices 131, 132, 133. In this exemplary embodiment, access node 110 may be a macrocell access node configured to deploy at least two different carriers, utilizing a first frequency F1 and a second frequency F2. Frequencies F1 and F2 may be any frequency band, or plurality of frequencies within a band class. For example, frequency F1 may be one of a first plurality of frequencies, or frequency blocks, that occupy a first frequency band class at or near 2.5 GHz, such that a first carrier utilizing frequency F1 may utilize frequency blocks within the first frequency band class, while frequency F2 may be one of a second plurality of frequencies, or frequency blocks, that comprise a second frequency band class at or near 750 MHz, such that a second carrier utilizing frequency F2 may utilize frequency blocks within the second frequency band class. Furthermore, carriers on frequencies F1 and F2 may be deployed using different types of multiplexing modes. For example, a carrier utilizing frequency F1 may be deployed by access node 110 in a TDD-LTE mode, and a carrier utilizing frequency F2 may be deployed by access node 110 in a FDD-LTE mode. In an embodiment, access node 110 may comprise two co-located cells, or antenna/transceiver combinations that are mounted on the same structure. In other embodiments, any other combination of access nodes and carriers deployed therefrom may be evident to those having ordinary skill in the art in light of this disclosure.

Wireless device 131 is illustrated as being in communication with access node 110 over communication link 141 utilizing frequency F1, wireless device 132 is illustrated as being in communication with access node 110 over communication link 142 utilizing both frequencies F1 and F2, and wireless device 133 is illustrated as being in communication with access node 110 over communication link 143 utilizing frequency F2. Thus, wireless device 132 may be considered as being capable of carrier aggregation, i.e. communicating a single data stream over both carriers F1 and F2. Further, one or more of wireless devices 131, 132, and 133 may be capable of operating in a high-powered transmission mode, as further described herein.

Further, as described herein, access node 110, a processing node communicatively coupled to access node 110, or any other node within system 100, may be configured to adjust handover thresholds for high-powered wireless devices among wireless devices 131, 132, 133 based on a bandwidth of carriers F1 and F2 deployed by access node 110. For example, at least wireless device 132 may be assigned to a high power class, which enables wireless device 132 to utilize a transmission power level that is higher than a standard transmission power level utilized by other wireless devices assigned to a standard power class. Further, wireless device 132 may be capable of operating in a carrier aggregation mode. Such capabilities of high-powered transmission and carrier aggregation may be determined by system 100 based on an attach request or a capability report within the attach request transmitted from wireless device 132, or from any other source of information related to attributes of the high-powered wireless devices stored on, for instance, database 105.

Once wireless device 132 is identified as a high-powered wireless device capable of carrier aggregation, handover thresholds for wireless device 132 are adjusted based on a channel bandwidth of one or more carriers F1 and F2. For example, wireless device 132 may be attached to carrier F1, and a bandwidth is identified for both carriers F1 and F2 deployed within system 100. If carrier F2 has a low bandwidth, then a handover threshold of carrier F2 is raised, such that a handover of wireless device 132 to carrier F2 is prevented or discouraged. For example, a channel bandwidth of carrier F2 may be below a bandwidth threshold. This triggers an adjustment to the handover threshold associated with carrier F2, such that wireless device 132 is discouraged from initiating a handover to carrier F2. Adjusting the handover threshold may include increasing or raising a threshold signal level associated with carrier F2. The adjustment may further comprise decreasing or lowering a threshold signal level of carrier F1, such that wireless device 132 remains attached to carrier F1 for a longer time.

However, if carrier F2 has a high bandwidth, then a handover threshold of carrier F2 is lowered, such that a handover of wireless device 132 to carrier F2 is performed or encouraged. For example, a channel bandwidth of carrier F2 may be above a bandwidth threshold, which triggers an adjustment to the handover threshold associated with carrier F2, such that wireless device is encouraged to initiate a handover to carrier F2. Adjusting the handover threshold may include decreasing or lowering a threshold signal level associated with carrier F2. The adjustment may further comprise increasing or raising a threshold signal level of carrier F1, such that wireless device 132 is triggered to detach from carrier F1 sooner. Upon being handed over to carrier F2, wireless device 132 may aggregate both carriers F1 and F2, using F2 as the primary carrier, and thus avail of the bandwidth provided by both carriers.

As described above, carrier F1 may be a TDD carrier, and carrier F2 may be an FDD carrier. In this case, handover thresholds for wireless device 132 (and other wireless devices capable of operating in a high-powered transmission mode and using carrier aggregation) are adjusted based on matching a resource requirement of the wireless device with a frame configuration of the TDD carrier. For example, a resource requirement of wireless device 132 may be determined. The resource requirement may include either an increased uplink resource requirement, or an increased downlink resource requirement. The determination of increased uplink versus downlink requirements may be based on thresholds defined by a network operator. The resource requirement of wireless device 132 may be compared with a frame configuration of radio frames deployed within TDD carrier F1. The frame configuration for each frame comprises a sequence of subframes that may be either uplink-biased or downlink-biased. Similar to the resource requirement, the 'bias' of each frame configuration may be based on thresholds defined by a network operator. For example, a frame configuration FC1 in a TDD-LTE system may comprise uplink (U), downlink (D), and special (S) subframes in the following sequence: DSUUDDSUUD, which indicates an equal amount of downlink and uplink subframes, i.e. 4 of each. In contrast, a frame configuration FC2 may comprise subframes in the following sequence: DSUDDDSUDD, which indicates more downlink subframes than uplink subframes, i.e. 6 vs 2. In this embodiment, frame configuration FC1 may be defined (by a network operator) as an uplink-biased frame configuration, and frame configuration FC2 may be defined as a downlink-biased frame configuration. Further, an association is formed between different resource requirements and different frame configurations. For example, if more uplink resources than downlink resources are required by the wireless device, then the wireless device is encouraged to stay attached to a TDD carrier deploying an uplink-biased frame configuration, and encouraged to be handed over from a TDD carrier deploying a downlink-biased frame configuration.

When a match is determined between the resource requirement and a frame configuration, (i.e. wireless device 132 requiring more uplink resources while carrier F1 deploys an uplink-biased frame configuration), the one or more thresholds are adjusted to prevented or discourage a handover to FDD carrier F2, as described herein. Alternatively, upon determining that the resource requirement and frame configuration do not match (i.e. wireless device 132 requiring more downlink resources while carrier F1 deploys an uplink-biased frame configuration, or wireless device 132 requiring more uplink resources while carrier F1 deploys a downlink-biased frame configuration) the one or more handover thresholds are adjusted such that a handover to of wireless device 132 to carrier F2 is performed or encouraged, as described herein. In an exemplary embodiment, a combination of frame configurations and available bandwidth may be used to adjust the handover thresholds. For example, a mismatch of a frame configuration of a TDD carrier with requirements of a wireless device attached to the TDD carrier may trigger a decision to handover the wireless device, and available bandwidth of one or more FDD carriers may be used to adjust the handover thresholds, or vice versa. Alternatively, different priorities may be assigned to each of the frame configuration of the TDD carrier and the bandwidths of the one or more FDD carriers, and handover thresholds adjusted based on which factor is higher-prioritized.

In either case, adjusted handover thresholds may be transmitted to wireless device 132 via a control message via access node 110. In some embodiments, bandwidths of additional carriers (not shown) are identified, and handover thresholds for each carrier are adjusted accordingly, and transmitted to wireless device 132. In some embodiments, a plurality of high-powered wireless devices capable of carrier aggregation are identified, handover thresholds adjusted accordingly, and are transmitted to each high-powered wireless device. In some embodiments, wireless device 132 may report signal level measurements of different carriers, and handovers performed or prevented based on the updated thresholds. Further, as described herein, upon being handed over to carrier F2, wireless device 132 is configured to utilize carrier aggregation with carrier F2 as a primary carrier and carrier F1 as a secondary carrier, thereby making use of available bandwidth of both carriers.

Access node 110 can be any network node configured to provide communication between wireless devices 132, 132, 133 and communication network 101, including standard access nodes such as a macro-cell access node, base transceiver station, a radio base station, an eNodeB device, an enhanced eNodeB device, or the like. In an exemplary embodiment, a macro-cell access node can have a coverage area in the range of approximately five kilometers to thirty-five kilometers and an output power in the tens of watts. Alternatively, access node 110 may comprise a short range, low power, small-cell access node such as a microcell access node, a picocell access node, a femtocell access node, or a home eNodeB device.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access node 110 may communicate with other access nodes (not shown), using a wireless link or a wired link such as an X2 link. Components of exemplary access nodes 110 are further described with reference to FIG. 2.

Wireless devices 132, 132, 133 may be any device, system, combination of devices, or other such communication platform capable of communicating wirelessly with access node 110 using one or more frequency bands deployed therefrom. Each of wireless devices 132, 132, 133 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 132, 132, 133. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (Wi-MAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106, 107 may include Si communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as bandwidths of carriers deployed by access node 110, capabilities of wireless devices 132, 132, 133, associations between carrier bandwidths and handover thresholds, and so on. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
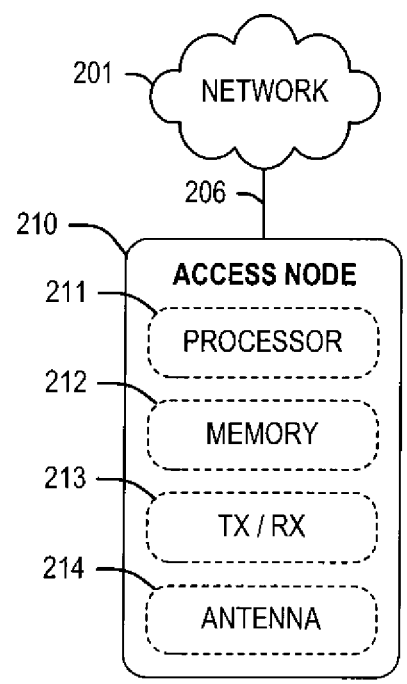
FIG. 2 depicts an exemplary access node.

FIG. 2 depicts an exemplary access node 210. Access node 210 may comprise, for example, a macro-cell access node, such as access node 110 described with reference to FIG. 1. Access node 210 is illustrated as comprising a processor 211, memory 212, transceiver 213, and antenna 214. Processor 211 executes instructions stored on memory 212, while transceiver 213 and antenna 214 enable wireless communication with other network nodes, such as wireless devices and relay nodes. For example, access node 210 may be configured to deploy at least two different carriers utilizing different frequency bands or sub-bands, and different types of multiplexing modes. For example, a first carrier utilizing a first frequency may be deployed by access node 210 in a TDD-LTE mode, and a second carrier utilizing a second frequency may be deployed by access node 210 in a FDD-LTE mode. These features may be enabled by access node 210 comprising two co-located cells, or antenna/transceiver combinations that are mounted on the same structure.

Further, instructions stored on memory 212 can include adjusting handover thresholds for high-powered wireless devices based on a bandwidth of carriers deployed by access node 210 (or by other access nodes), by determining that the wireless device is assigned to a high power class and capable of carrier-aggregation, identifying bandwidths for at least a first carrier and a second carrier, and adjusting the handover thresholds based on the identified bandwidths. For example, if the second carrier has a low bandwidth, then a handover threshold of the second carrier is raised, such that a handover of the high-powered wireless device to the second carrier is prevented or discouraged. Adjusting the handover threshold may include increasing or raising a threshold signal level associated with the second carrier. The adjustment may further comprise decreasing or lowering a threshold signal level of the first carrier, such that the high-powered wireless device remains attached to the first carrier for a longer time. Alternatively or in addition, if the second carrier has a high bandwidth, then a handover threshold of the second carrier is lowered, such that a handover of the high-powered wireless device to the second carrier is performed or encouraged. Adjusting the handover threshold may include decreasing or lowering a threshold signal level associated with the second carrier. The adjustment may further comprise increasing or raising a threshold signal level of the first carrier, such that the high-powered wireless device is triggered to detach from the first carrier sooner. Further, handover thresholds may be adjusted based on matching a resource requirement of a high-powered wireless device with a frame configuration of a carrier to which the high-powered wireless device is attached, such as the first (TDD) carrier. The resource requirement may include either an increased uplink resource requirement, or an increased downlink resource requirement. The determination of increased uplink versus downlink requirements may be based on thresholds defined by a network operator, and stored on memory 212. The resource requirement is compared with a frame configuration of radio frames deployed within the TDD carrier. Similar to the resource requirement, the 'bias' of each frame configuration may be based on thresholds defined by a network operator and stored on memory 212. In some embodiments, an association is formed between different resource requirements and different frame configurations and stored on memory 212 or retrieved from another network node. When a match is determined between the resource requirement and a frame configuration, the one or more thresholds are adjusted to prevented or discourage a handover to the second (FDD) carrier, as described herein. Alternatively, upon determining that the resource requirement and frame configuration do not match, the one or more handover thresholds are adjusted such that a handover to of the high-powered wireless device to the second carrier is performed or encouraged, as described herein. The adjusted handover thresholds may be transmitted to the high-powered wireless device via a control message generated by access node 210.

Figure 3:
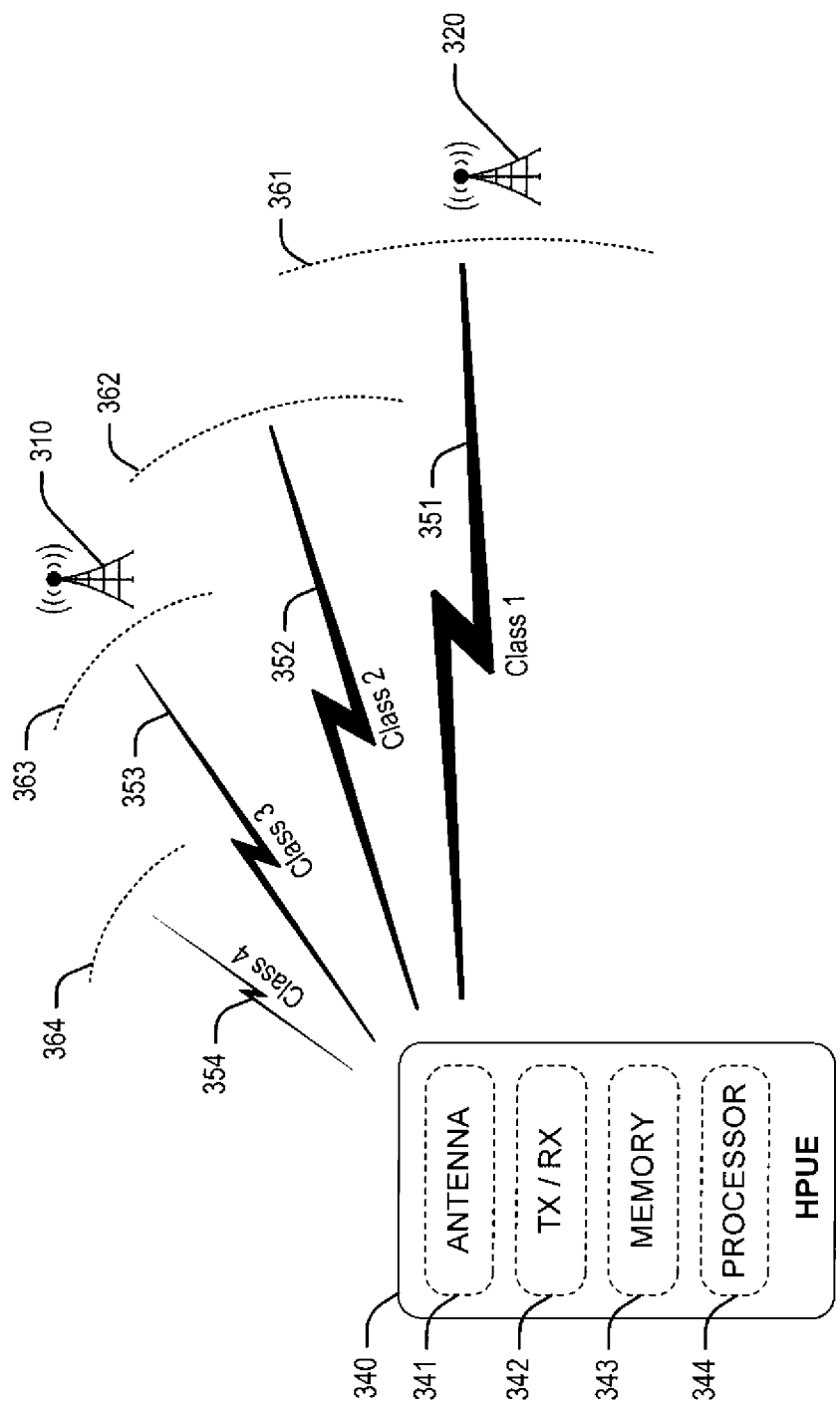
FIG. 3 depicts an exemplary wireless device capable of transmitting using different power classes.

FIG. 3 depicts an exemplary wireless device 340 capable of transmission in several power classes. As noted above, wireless devices can be configured as different power class wireless devices (e.g., high-power wireless devices and/or standard-power wireless devices as well as low-power wireless devices). Wireless device 340 is therefore equipped with an appropriate antenna 341 and transceiver 342 enabling increased transmit power from wireless device 340 to one or more access node 310, 320. For example, wireless device 340 is capable of operating in a transmission mode utilizing power class 1, to transmit an uplink transmission 351 at a range 361. Wireless device 340 may further switch transmission modes to utilizing power class 2 to transmit uplink transmission 352 at a range 362, utilizing power class 3 to transmit uplink transmission 353 at a range 363, and utilizing power class 4 to transmit uplink transmission 354 at a range 364. Antenna 341 and transceiver 342 are appropriately configured to utilize these differently-powered transmission modes. Further, an effective coverage area of an access node can be limited by an amount of power available to a wireless device, enabling wireless devices capable of utilizing high-power transmission modes to communicate with access nodes from a longer distance than standard-power wireless devices. In other words, effective coverage areas of access nodes 310, 320 can change dynamically based on a transmit power level of uplink transmissions 351, 352, 353, 354. Consequently, real-time adjustment of the power classes of wireless devices can be performed by network operators to increase the effective coverage area of their access nodes, enabling more consumers will to use a given access node. For example, to enable communication with access node 320 from a long distance (such as an edge of a coverage area), wireless device 340 may be configured to transmit uplink transmissions 351 utilizing a high-power transmission mode such as power class 1. Alternatively, to enable communication with access node 310 from a short distance, wireless device 340 may be configured to transmit uplink transmissions 351 utilizing a standard-power transmission mode such as power class 3. Moreover, controlling the transmit power level or changing the power class of wireless devices can be performed by setting a maximum uplink transmission power value allowed by the serving access node to be equal to a standard maximum uplink transmission power value, and broadcasting the maximum uplink transmission power value to the wireless device via, for example, a system information message.

Figure 4:
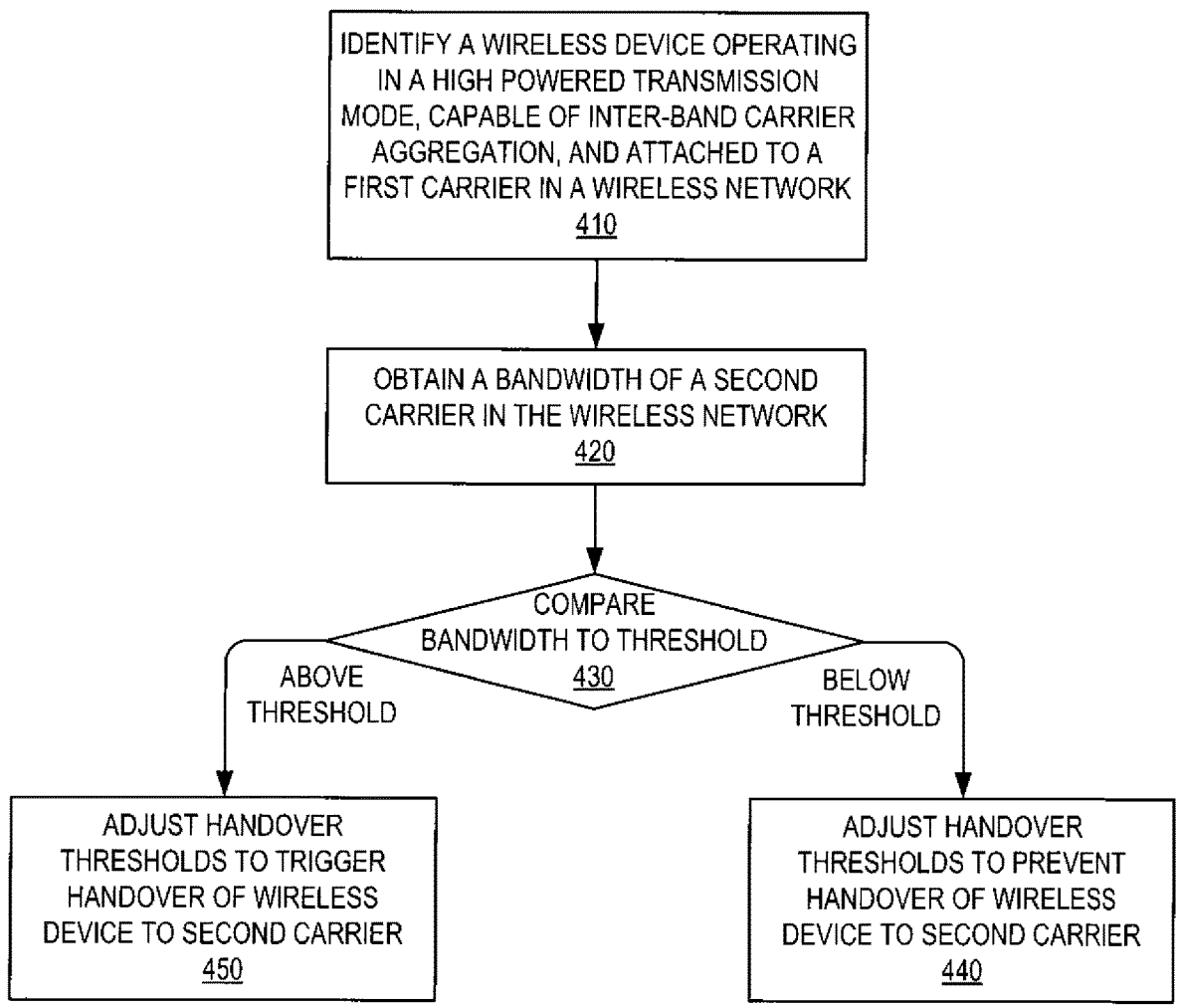
FIG. 4 depicts an exemplary method for adjusting handover thresholds for high-powered wireless devices in a wireless network.

FIG. 4 depicts an exemplary method for adjusting handover thresholds for high-powered wireless devices in a wireless network. The method of FIG. 4 may be implemented by an access node (such as access node 110, 210), by a controller node (such as controller node 104), or by any other network node. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 410, wireless devices operating in a high-powered transmission mode and capable of carrier aggregation are identified. For example, a wireless device attached to a first carrier in a wireless network may be assigned to a high power class, which enables the wireless device to utilize a transmission power level that is higher than a standard transmission power level utilized by other wireless devices assigned to a standard power class. Further, the wireless device may be capable of operating in a carrier aggregation mode. Such capabilities of high-powered transmission and carrier aggregation may be determined at 410 based on, for instance, an attach request or a capability report within the attach request transmitted from the wireless device or from any other source of information related to attributes of the high-powered wireless devices.

Once a wireless device is identified as a high-powered wireless device capable of carrier aggregation then, at 420, a channel bandwidth of one or more carriers deployed by the access node (including the first carrier) are identified. For example, the wireless device may be attached to a first carrier, and a bandwidth is identified for the first carrier at least a second carrier deployed within the wireless network. If the second carrier has a low bandwidth, then a handover threshold of the second carrier is raised, such that a handover of the wireless device to the second carrier is prevented or discouraged. For example, the channel bandwidth of the second carrier may be below a bandwidth threshold. Alternatively or in addition, the channel bandwidth of the second carrier may be relatively lower than a channel bandwidth of the first carrier, or lower by a threshold amount.

If the comparison 430 yields a low bandwidth then, at 440, an adjustment is triggered to the handover threshold associated with the second carrier, such that the wireless device is discouraged from initiating a handover to the second carrier. Adjusting the handover threshold may include increasing or raising a threshold signal level associated with the second carrier. The adjustment may further comprise decreasing or lowering a threshold signal level of the second carrier, such that the wireless device remains attached to the second carrier for a longer time.

However, if the comparison at 430 yields a high bandwidth, then at 450 an adjustment to the handover threshold associated with the second carrier is triggered, such that the wireless device is encouraged to initiate a handover to the second carrier. For example, adjusting the handover threshold may include decreasing or lowering a threshold signal level associated with the second carrier. The adjustment may further comprise increasing or raising a threshold signal level of the first carrier, such that the wireless device is triggered to detach from the first carrier sooner. Upon being handed over to the second carrier, the wireless device may aggregate both first and second carriers, using the second carrier as the primary carrier, and thus availing of the bandwidth provided by both carriers. In either case, adjusted handover thresholds may be transmitted to the wireless device via a control message.

Figure 5:
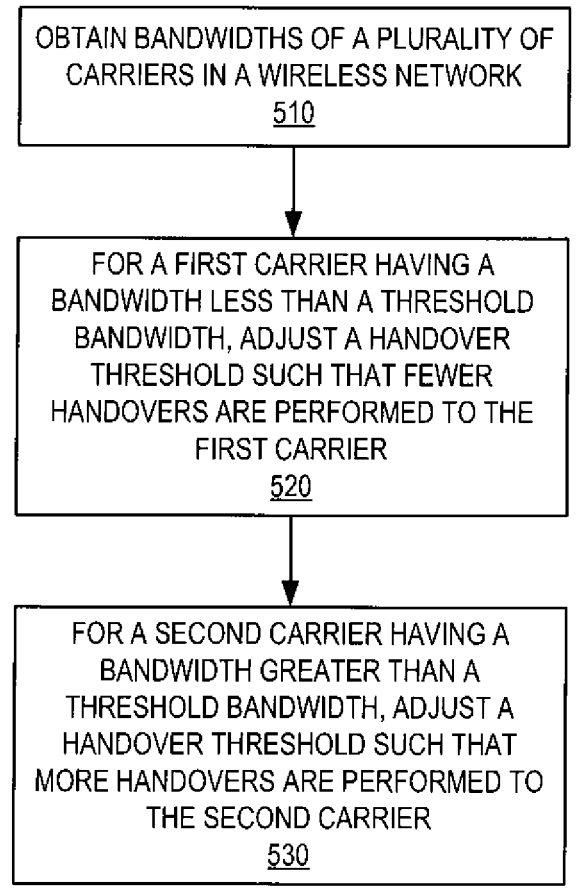
FIG. 5 depicts another exemplary method for adjusting handover thresholds for high-powered wireless devices in a wireless network.

In some embodiments, bandwidths of a plurality of carriers are identified, and handover thresholds for each carrier are adjusted accordingly, and transmitted to high-powered wireless devices capable of carrier aggregation. FIG. 5 depicts such a method for adjusting handover thresholds for high-powered wireless devices in a wireless network. The method of FIG. 5 may be implemented by an access node (such as access node 110, 210), by a controller node (such as controller node 104), or by any other network node. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 510, a channel bandwidth of a plurality of carriers deployed within a wireless network are identified. For example, one or more access nodes within the wireless network may be configured to deploy a plurality of carriers of different frequency bands or sub-bands, some of which may utilize different duplexing methods. For example, a wireless network may deploy three different carriers, a first carrier having a bandwidth of 5 MHz, a second carrier having a bandwidth of 10 MHz, and a third carrier having a bandwidth of 20 MHz. In an exemplary embodiment, the first and second carriers may comprise FDD carriers, and the third carrier may comprise a TDD carrier.

In either case, the bandwidth of each carrier is identified to determine how to adjust handover thresholds. For example, at 520, the first carrier is identified having a bandwidth less than a threshold bandwidth, or equal to a low threshold. For example, the threshold bandwidth may be 5 MHz, such that when the bandwidth is less than or equal to 5 MHz, it is considered as a "low" bandwidth. Thus, handover threshold(s) associated with the first carrier are adjusted, such that fewer handovers are performed to the first carrier. Adjusting the handover threshold(s) may include increasing or raising a threshold signal level associated with the first carrier. The adjustment may further comprise decreasing or lowering a threshold signal level of one or more other carriers, such that the wireless device remains attached to (or is handed over to) the other carriers versus the first carrier.

Further, at 530, the second carrier may be identified that has a bandwidth greater than a threshold bandwidth, or equal to a high threshold. For example, the threshold bandwidth may be 10 MHz, such that when the bandwidth is greater than or equal to 10 MHz, it is considered as a "high" bandwidth. Thus, handover thresholds associated with the second carrier are adjusted such that more handovers are performed to that carrier. For example, adjusting the handover threshold may include decreasing or lowering a threshold signal level associated with the second carrier. The adjustment may further comprise increasing or raising a threshold signal level of the first carrier, such that the wireless device is triggered to detach from the first carrier sooner.

In an exemplary embodiment, the wireless device is connected to the third carrier, and the comparison of bandwidths 520 and 530 is performed for the first and second carriers as described above. Thus, upon being handed over to the second carrier, the wireless device may aggregate both second and third carriers, using the second carrier as the primary carrier, and availing of the bandwidth provided by both carriers. Alternatively, or in addition, the third carrier may be included in the bandwidth comparison, and handover thresholds adjusted such that the wireless device either remains on the carrier with the highest bandwidth, or is triggered to perform carrier aggregation with the two carriers having the highest bandwidths. Other combinations may become apparent to those having ordinary skill in the art in light of this disclosure.

Figure 6A:
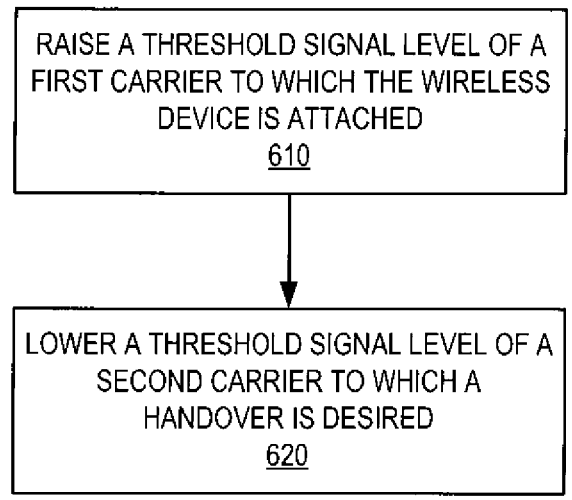
FIGS. 6A-6B depict an exemplary method for adjusting handover thresholds to trigger a handover of a high-powered wireless device to a second carrier.
Figure 6B:
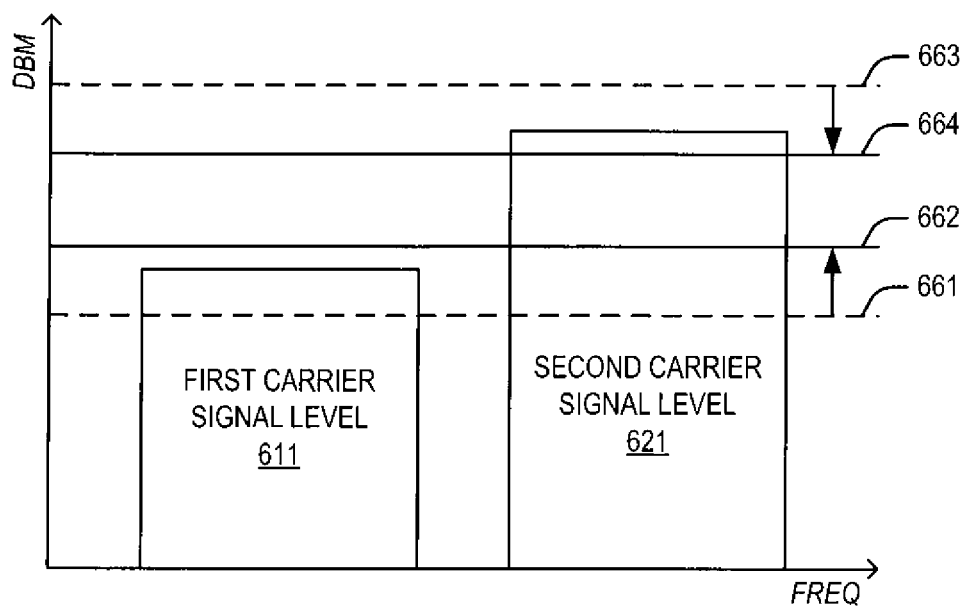

FIGS. 6A-6B depict an exemplary method for adjusting handover thresholds to trigger a handover of a high-powered wireless device to a second carrier. With reference to FIG. 6A, the method depicted therein may be implemented by an access node (such as access node 110, 210), by a controller node (such as controller node 104), or by any other network node. Although FIG. 6A depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

To trigger a handover of a wireless device to a second carrier, at 610, a threshold signal level is raised for a first carrier to which a wireless device is attached and, at 620, a threshold signal level is lowered for the second carrier to which the handover is desired. FIG. 6B depicts exemplary signal level threshold adjustments that are applied to a first carrier signal level 611 and a second carrier signal level 621. In this embodiment, adjusting the handover thresholds may include increasing or raising a threshold signal level associated with the first carrier from previous level 661 to new level 662. Thus, whereas first carrier signal level 611 was previously above threshold 661, thereby being sufficiently high so as not to trigger a handover request, the new threshold level 662 is higher than first carrier signal level 611, thereby potentially triggering a handover request. Similarly, the adjustment may comprise decreasing or lowering a threshold signal level associated with the second carrier from a previous signal level 663 to a new signal level 664. Thus, whereas second carrier signal level 621 was previously lower than threshold signal level 663, it is now within the new threshold level 664, such that the high-powered wireless device is more likely to be handed over to the second carrier.

Figure 7A:
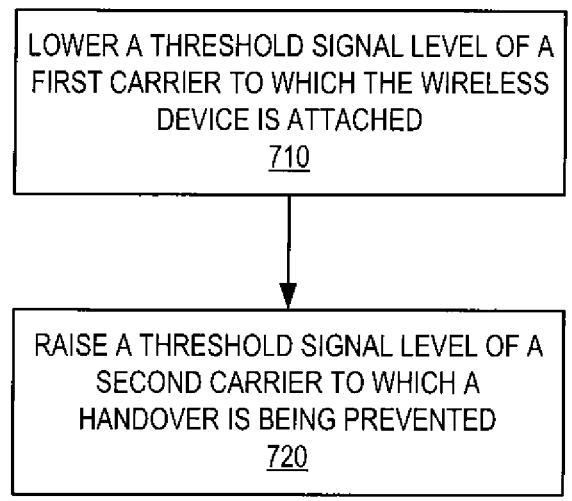
FIGS. 7A-7B depict an exemplary method for adjusting handover thresholds to prevent a handover of a high-powered wireless device to a second carrier.
Figure 7B:
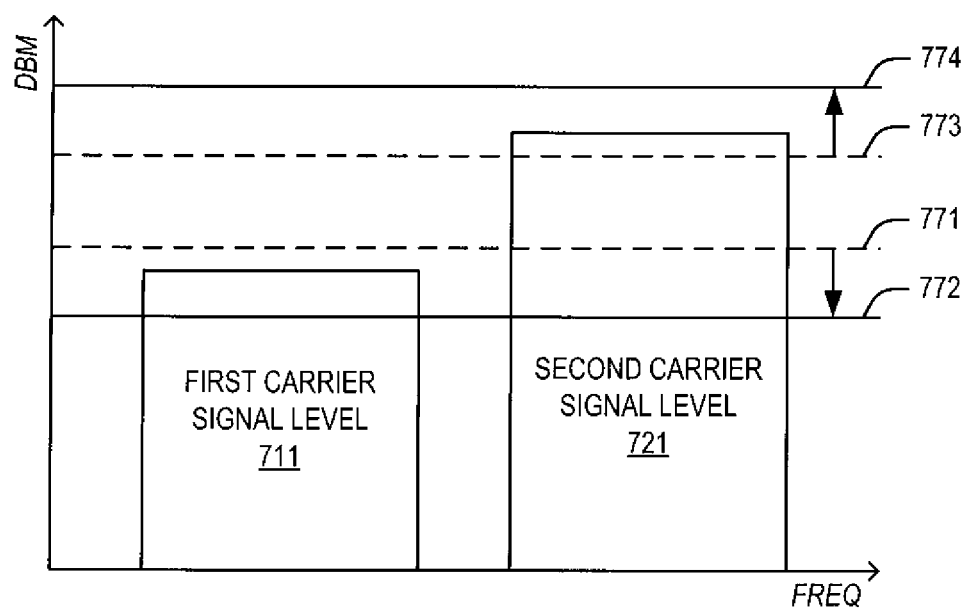

Other combinations of handover triggers may be within the purview of those having ordinary skill in the art in light of this disclosure. In an exemplary embodiment, the triggers may comprise thresholds, offsets, or hysteresis values for an A4 measurement event, A5 measurement event, B1 measurement event, or B2 measurement event (e.g., when implementing an LTE network). For example, a wireless device may be handed over from a first carrier based on a triggered A5 event. Here, a received first signal level plus a hysteresis may be compared to a first threshold and a received second signal level plus offsets minus a hysteresis may be compared to a second threshold. The first received signal level may comprise a received signal level from the first carrier and the second received signal level may comprise a received signal level from a second (or target) carrier, where the first and seconds signals are received at the wireless device. Some example signal levels may comprise a Received Signal Strength Indicator, (RSSI), Reference Signal Received Quality (RSRQ), RSRP, or any other suitable signal level FIGS. 7A-7B depict an exemplary method for adjusting handover thresholds to prevent a handover of a high-powered wireless device to a second carrier. With reference to FIG. 7A, the method depicted therein may be implemented by an access node (such as access node 110, 210), by a controller node (such as controller node 104), or by any other network node. Although FIG. 7A depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

To prevent a handover of a wireless device to a second carrier, at 710, a threshold signal level is lowered for a first carrier to which a wireless device is attached and, at 720, a threshold signal level is raised for the second carrier to which the handover is desired. FIG. 7B depicts exemplary signal level threshold adjustments that are applied to a first carrier signal level 711 and a second carrier signal level 721. In this embodiment, adjusting the handover thresholds may include increasing or raising a threshold signal level associated with the first carrier from previous level 771 to new level 772. Thus, whereas first carrier signal level 711 was previously below threshold 771, thereby being low enough to potentially trigger a handover request, the new threshold level 772 is lower than first carrier signal level 711, thereby preventing a handover request. Similarly, the adjustment may comprise increasing or raising a threshold signal level associated with the second carrier from a previous signal level 773 to a new signal level 774. Thus, whereas second carrier signal level 721 was previously higher than threshold signal level 773, it is now under the new threshold level 774, such that the high-powered wireless device is less likely to request a handover to the second carrier.

Figure 8:
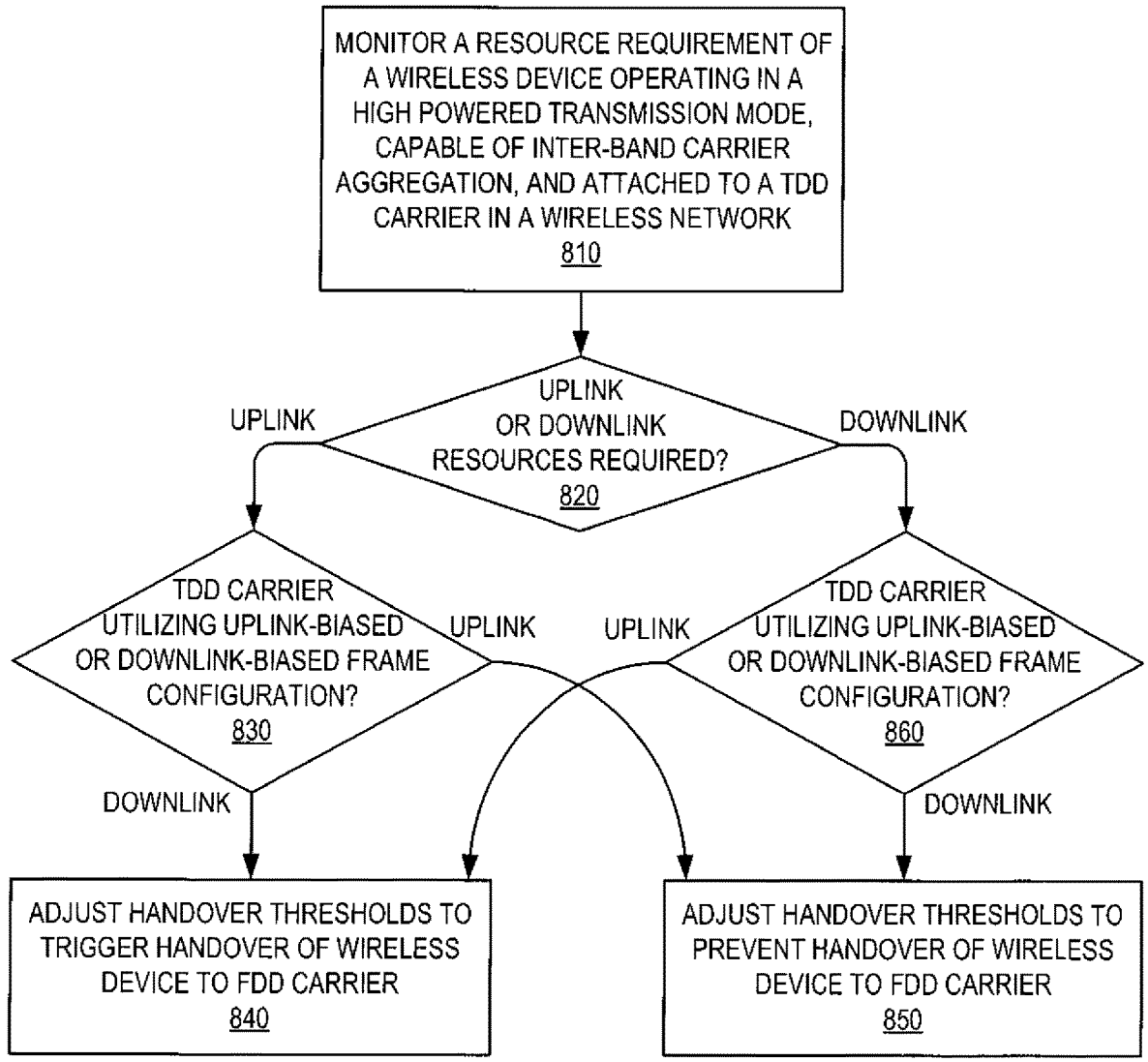
FIG. 8 depicts an exemplary method for adjusting handover thresholds for high-powered wireless devices based on a resource requirement and a frame configuration.

Other combinations of handover triggers may be within the purview of those having ordinary skill in the art in light of this disclosure. In an exemplary embodiment, the triggers may comprise thresholds, offsets, or hysteresis values for an A4 measurement event, A5 measurement event, B1 measurement event, or B2 measurement event (e.g., when implementing an LTE network). For example, a wireless device may be handed over from a first carrier based on a triggered A5 event. Here, a received first signal level plus a hysteresis may be compared to a first threshold and a received second signal level plus offsets minus a hysteresis may be compared to a second threshold. The first received signal level may comprise a received signal level from the first carrier and the second received signal level may comprise a received signal level from a second (or target) carrier, where the first and seconds signals are received at the wireless device. Some example signal levels may comprise a Received Signal Strength Indicator, (RSSI), Reference Signal Received Quality (RSRQ), RSRP, or any other suitable signal level As described above, an access node may deploy both TDD and FDD carriers, in which case handover thresholds for a high-powered wireless device capable of using carrier aggregation are adjusted based on matching a resource requirement of the wireless device with a frame configuration of the TDD carrier. FIG. 8 depicts an exemplary method for adjusting handover thresholds for high-powered wireless devices based on a resource requirement and a frame configuration. The method of FIG. 8 may be implemented by an access node (such as access node 110, 210), by a controller node (such as controller node 104), or by any other network node. Although FIG. 8 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 810, a resource requirement is monitored for a high-powered wireless device capable of operating in a carrier aggregation mode. The high-powered wireless device may be attached to a TDD carrier provided by the wireless network. The resource requirement may include either an increased uplink resource requirement, or an increased downlink resource requirement. At 820, a determination of whether the resource requirement comprises an increased uplink versus increased downlink requirement is used to determined how to change the handover thresholds. The definition of increased uplink vs downlink resource requirements may be based on thresholds or other conditions defined by a network operator. For example, if the wireless device is live-streaming or uploading data, then the wireless device may be considered to have an increased uplink resource requirement. In this case, it is further determined at 830 whether the TDD carrier is utilizing an uplink-biased frame configuration or a downlink-biased frame configuration. The determination of uplink-bias vs downlink-bias is further defined by a network operator, as further described above. If the bias of the carrier matches the resource requirement (i.e. if the carrier is uplink-biased), then at 850 the handover thresholds are adjusted so as to prevent the wireless device from being handed over to the FDD carrier. If there is a mismatch between the resource requirement and the bias of the frame configuration, then at 840 the handover thresholds are adjusted so as to prevent a handover of the wireless device to the FDD carrier.

It may be determined, at 820, that the resource requirement comprises an increased downlink requirement. For example, the wireless device may be streaming multimedia from a media server or another network node. In this case, it is further determined at 860 whether the TDD carrier is utilizing an uplink-biased frame configuration or a downlink-biased frame configuration. The determination of uplink-bias vs downlink-bias is further defined by a network operator, as further described above. If the bias of the carrier matches the resource requirement (i.e. if the carrier is downlink-biased), then at 850 the handover thresholds are adjusted so as to prevent the wireless device from being handed over to the FDD carrier. If there is a mismatch between the resource requirement and the bias of the frame configuration, then at 840 the handover thresholds are adjusted so as to prevent a handover of the wireless device to the FDD carrier. Further, in either case, the resource requirement of the wireless device may be based on recent or historical trends, and refreshed over time, so as to determine whether the wireless device generally has an increased uplink or an increased downlink resource requirement.

The methods, systems, devices, networks, access nodes, and equipment described above may be implemented with, contain, or be executed by one or more computer systems and/or processing nodes. The methods described above may also be stored on a non-transitory computer readable medium. Many of the elements of system 100 may be, comprise, or include computers systems and/or processing nodes. This includes, but is not limited to: access node 110, relay node 120, controller node 104, and/or network 101.

Figure 9:
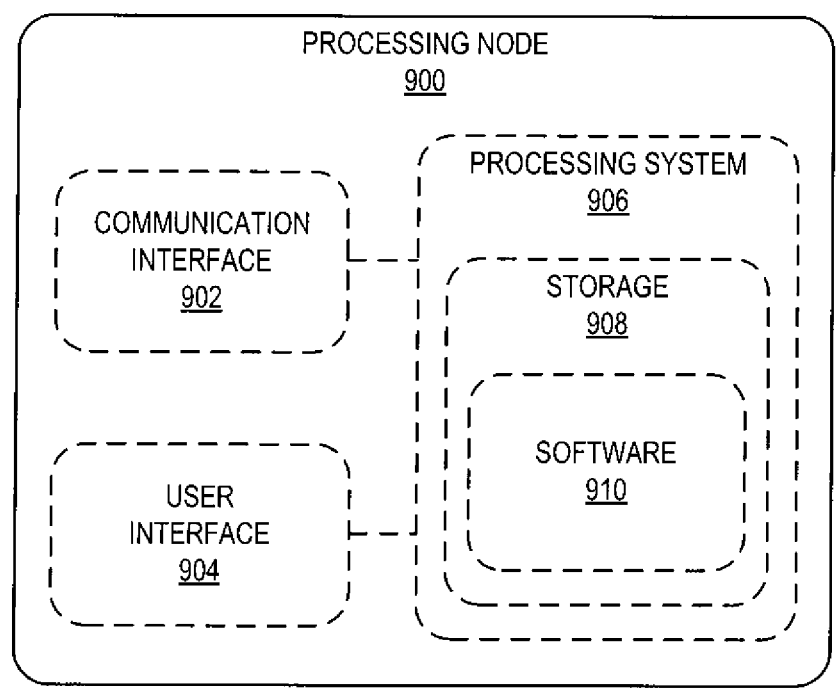
FIG. 9 depicts an exemplary processing node for adjusting handover thresholds for high-powered wireless devices in a wireless network.

FIG. 9 depicts an exemplary processing node for performing carrier aggregation based on control channel load levels. Processing node 900 comprises a communication interface 902, user interface 904, and processing system 906 in communication with communication interface 902 and user interface 904. Processing system 906 includes storage 908, which can comprise a disk drive, flash drive, memory circuitry, or other memory device. Storage 908 can store software 910 which is used in the operation of the processing node 900. Storage 908 may include a disk drive, flash drive, data storage circuitry, or some other memory apparatus. For example, storage 908 may include a buffer. Software 910 may include computer programs, firmware, or some other form of machine-readable instructions, including an operating system, utilities, drivers, network interfaces, applications, or some other type of software. For example, software 910 may include a module for performing transmission power control operations described herein. Processing system 906 may include a microprocessor and other circuitry to retrieve and execute software 910 from storage 908. Processing node 900 may further include other components such as a power management unit, a control interface unit, etc., which are omitted for clarity. Communication interface 902 permits processing node 900 to communicate with other network elements. User interface 904 permits the configuration and control of the operation of processing node 900.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A processing node for adjusting handover thresholds in a wireless network, the processing node being configured to perform operations comprising:
   determining a resource requirement of a high-powered wireless device attached to a first carrier, wherein the high-powered wireless device is configured to utilize a transmission power level that is higher than a standard transmission power level utilized by standard-powered wireless devices, and wherein the resource requirement comprises one of an increased uplink resource requirement or an increased downlink resource requirement; and
   adjusting one or more handover thresholds for a handover of the high-powered wireless device to a second carrier based on a frame configuration of the first carrier, wherein the frame configuration comprises one of an uplink-biased frame configuration and a downlink-biased frame configuration,
   wherein upon being handed over to the second carrier, the wireless device is configured to utilize carrier aggregation with the second carrier as a primary carrier and the first carrier as a secondary carrier.

2. The processing node of claim 1, wherein the operations further comprise:
   determining that the resource requirement comprises an increased downlink resource requirement and that the frame configuration is an uplink-biased frame configuration; and
   adjusting the one or more handover thresholds such that a handover to of the high-powered wireless device to the second carrier is performed.

3. The processing node of claim 1, wherein the operations further comprise:
   determining that the resource requirement comprises an increased downlink resource requirement and that the frame configuration is a downlink-biased frame configuration; and
   adjusting the one or more handover thresholds such that a handover to of the high-powered wireless device to the second carrier is prevented.

4. The processing node of claim 1, wherein the operations further comprise:
   determining that the resource requirement comprises an increased uplink resource requirement and that the frame configuration is a downlink-biased frame configuration; and
   adjusting the one or more handover thresholds such that a handover to of the high-powered wireless device to the second carrier is performed.

5. The processing node of claim 1, wherein the one or more handover thresholds are adjusted further responsive to the channel bandwidth meeting one or more thresholds.

6. The processing node of claim 5, further comprising:
   determining that the channel bandwidth of the second carrier meets a bandwidth threshold; and
   adjusting the handover threshold such that the wireless device is encouraged to initiate a handover to the second carrier.

7. The processing node of claim 5, further comprising:
   determining that the channel bandwidth of the second carrier is below a bandwidth threshold; and adjusting the handover threshold such that the wireless device is discouraged from initiating a handover to the second carrier.

8. A method for adjusting handover thresholds in a wireless network, the method comprising:
  determining a resource requirement of a high-powered wireless device attached to a first carrier, wherein the high-powered wireless device is configured to utilize a transmission power level that is higher than a standard transmission power level utilized by standard-powered wireless devices, and wherein the resource requirement comprises one of an increased uplink resource requirement or an increased downlink resource requirement; and
  adjusting one or more handover thresholds for a handover of the high-powered wireless device to a second carrier based on a frame configuration of the first carrier, wherein the frame configuration comprises one of an uplink-biased frame configuration and a downlink-biased frame configuration,
  wherein upon being handed over to the second carrier, the wireless device is configured to utilize carrier aggregation with the second carrier as a primary carrier and the first carrier as a secondary carrier.

9. The method of claim 8, wherein the operations further comprise:
  determining that the resource requirement comprises an increased downlink resource requirement and that the frame configuration is an uplink-biased frame configuration; and
  adjusting the one or more handover thresholds such that a handover to of the high-powered wireless device to the second carrier is performed.

10. The method of claim 8, wherein the operations further comprise:
  determining that the resource requirement comprises an increased downlink resource requirement and that the frame configuration is a downlink-biased frame configuration; and
  adjusting the one or more handover thresholds such that a handover to of the high-powered wireless device to the second carrier is prevented.

11. The method of claim 8, wherein the operations further comprise:
  determining that the resource requirement comprises an increased uplink resource requirement and that the frame configuration is a downlink-biased frame configuration; and
  adjusting the one or more handover thresholds such that a handover to of the high-powered wireless device to the second carrier is performed.

12. The method of claim 8, wherein the one or more handover thresholds are adjusted further responsive to the channel bandwidth meeting one or more thresholds.

13. The method of claim 12, further comprising:
  determining that the channel bandwidth of the second carrier meets a bandwidth threshold; and
  adjusting the handover threshold such that the wireless device is encouraged to initiate a handover to the second carrier.

14. The method of claim 12, further comprising:
  determining that the channel bandwidth of the second carrier is below a bandwidth threshold; and
  adjusting the handover threshold such that the wireless device is discouraged from initiating a handover to the second carrier.

15. A system for adjusting handover thresholds in a wireless network, the system comprising
  a processing node; and
  a processor coupled to the processing node, the processor for configuring the processing node to perform operations comprising:
  determining a resource requirement of a high-powered wireless device attached to a first carrier, wherein the high-powered wireless device is configured to utilize a transmission power level that is higher than a standard transmission power level utilized by standard-powered wireless devices, and wherein the resource requirement comprises one of an increased uplink resource requirement or an increased downlink resource requirement; and
  adjusting one or more handover thresholds for a handover of the high-powered wireless device to a second carrier based on a frame configuration of the first carrier, wherein the frame configuration comprises one of an uplink-biased frame configuration and a downlink-biased frame configuration,
  wherein upon being handed over to the second carrier, the wireless device is configured to utilize carrier aggregation with the second carrier as a primary carrier and the first carrier as a secondary carrier.

16. The system of claim 15, wherein the operations further comprise:
  determining that the resource requirement comprises an increased downlink resource requirement and that the frame configuration is an uplink-biased frame configuration; and
  adjusting the one or more handover thresholds such that a handover to of the high-powered wireless device to the second carrier is performed.

17. The system of claim 15, wherein the operations further comprise:
  determining that the resource requirement comprises an increased downlink resource requirement and that the frame configuration is a downlink-biased frame configuration; and
  adjusting the one or more handover thresholds such that a handover to of the high-powered wireless device to the second carrier is prevented.

18. The system of claim 15, wherein the operations further comprise:
  determining that the resource requirement comprises an increased uplink resource requirement and that the frame configuration is a downlink-biased frame configuration; and
  adjusting the one or more handover thresholds such that a handover to of the high-powered wireless device to the second carrier is performed.

19. The system of claim 15, wherein the one or more handover thresholds are adjusted further responsive to the channel bandwidth meeting one or more thresholds.

20. The system of claim 19, further comprising:
  determining that the channel bandwidth of the second carrier meets a bandwidth threshold; and
  adjusting the handover threshold such that the wireless device is encouraged to initiate a handover to the second carrier.

* * * * *